United States Patent
DenBoer et al.

(10) Patent No.: US 10,562,000 B2
(45) Date of Patent: Feb. 18, 2020

(54) ASSEMBLIES FOR MAKING SUPERHARD PRODUCTS BY HIGH PRESSURE/HIGH TEMPERATURE PROCESSING

(71) Applicant: Smith International, Inc., Houston, TX (US)

(72) Inventors: David P. DenBoer, Pleasant Grove, UT (US); Clint Hamilton, Payson, UT (US); Michael David France, Lehi, UT (US); Ryan J. Davis, Pleasant Grove, UT (US); Lynn L. Belnap, Spanish Fork, UT (US); Yi Fang, Orem, UT (US)

(73) Assignee: SMITH INTERNATIONAL, INC., Houston, TX (US)

( * ) Notice: Subject to any disclaimer, the term of this patent is extended or adjusted under 35 U.S.C. 154(b) by 50 days.

(21) Appl. No.: 15/556,645

(22) PCT Filed: Mar. 9, 2016

(86) PCT No.: PCT/US2016/021520
§ 371 (c)(1),
(2) Date: Sep. 8, 2017

(87) PCT Pub. No.: WO2016/145051
PCT Pub. Date: Sep. 15, 2016

(65) Prior Publication Data
US 2018/0043325 A1 Feb. 15, 2018

Related U.S. Application Data

(60) Provisional application No. 62/131,666, filed on Mar. 11, 2015.

(51) Int. Cl.
B29C 43/02 (2006.01)
B01J 3/06 (2006.01)
B29C 43/00 (2006.01)

(52) U.S. Cl.
CPC ............. *B01J 3/065* (2013.01); *B29C 43/006* (2013.01)

(58) Field of Classification Search
CPC ........................... B01J 3/0065; B29C 43/006
(Continued)

(56) References Cited

U.S. PATENT DOCUMENTS 4,333,902 A    6/1982   Hara
4,412,980 A    11/1983  Tsuji et al.
(Continued)

FOREIGN PATENT DOCUMENTS

WO    WO2013156536 A1    10/2013

OTHER PUBLICATIONS

International Search Report and Written Opinion issued in International patent application PCT/US2016/021520 dated Jun. 17, 2016. 14 pages.
(Continued)

*Primary Examiner* — Joseph S Del Sole
*Assistant Examiner* — Thu Khanh T Nguyen

(57) ABSTRACT

Assemblies as disclosed herein for making superhard products by HPHT process comprise a first can portion for accommodating a mixture of materials therein and a second can mated with the first can portion. A leak-tight seal is provided between the first can portion and second can portion in a manner that accommodates the manufacture of relatively longer superhard products without having to change other elements or members used for HPHT processing to thereby provide improved manufacturing flexibility and cost efficiency.

20 Claims, 11 Drawing Sheets

(58) Field of Classification Search
USPC .................................................. 425/77, 405.2
See application file for complete search history.

(56) References Cited

U.S. PATENT DOCUMENTS

| | | |
|---|---|---|
| 7,377,341 B2 | 5/2008 | Middlemiss et al. |
| 7,575,425 B2 | 8/2009 | Hall et al. |
| 7,628,234 B2 | 12/2009 | Middlemiss |
| 7,665,552 B2 | 2/2010 | Hall et al. |
| 7,842,111 B1 | 11/2010 | Sani |
| 7,927,085 B2 | 4/2011 | Hall et al. |
| 7,985,059 B2 | 7/2011 | Hall et al. |
| 8,236,074 B1 | 8/2012 | Bertagnolli et al. |
| 8,313,677 B2 | 11/2012 | Hall et al. |
| 8,758,463 B2 | 6/2014 | Cariveau et al. |
| 8,814,966 B1 | 8/2014 | Bertagnolli et al. |
| 2005/0044800 A1 | 3/2005 | Hall et al. |
| 2008/0230279 A1 | 9/2008 | Bitler et al. |
| 2009/0152018 A1 | 6/2009 | Sani |
| 2009/0301391 A1 | 12/2009 | Hall et al. |
| 2010/0236836 A1 | 9/2010 | Voronin |
| 2011/0171414 A1 | 7/2011 | Sreshta et al. |
| 2014/0326811 A1 | 11/2014 | Daniels et al. |

OTHER PUBLICATIONS

GuiLin Color Engineered Diamond Technology (EDT) Co., Ltd., "PCD and PDC Hammer Bits." web page: http://gcedt.en.hisupplier.com/product-1765305-PCD-and-PDC-HAMMER-BITS.html. Date accessed: Nov. 24, 2014.

Plemmons et al., New Cutter Technology for Faster Drilling in Hard/Abrasive Formations. Society of Petroleum Engineers. SPE 132143. International Oil and Gas Conference and Exhibition in China, Jun. 8-10, 2010, Beijing, China. 10 pages.

Kanyanta et al., Impact fatigue fracture of polycrystalline diamond compact (PDC) cutters and the effect of microstructure. International Journal of Refractory Metals and Hard Materials, 46, pp. 145-151. 2014.

Astakhov et al., Polycrystalline Diamond (PCD) Tool Material: Emerging Applications, Problems, and Possible Solutions. Traditional Machining Processes (pp. 1-32). Springer Berlin Heidelberg.

Isobe et al., Nanolayered diamond sintered compact obtained by direct conversion from highly oriented graphite under high pressure and high temperature. Journal of Nanomaterials, 2013, 15.

Ekimov et al., Thermal conductivity of diamond composites sintered under high pressures. Diamond and Related Materials, 2008 17(4), pp. 838-843.

ASSEMBLIES FOR MAKING SUPERHARD PRODUCTS BY HIGH PRESSURE/HIGH TEMPERATURE PROCESSING

CROSS REFERENCE PARAGRAPH

This application claims the benefit of U.S. Provisional Application No. 62/131,666, entitled "ASSEMBLIES FOR MAKING SUPERHARD PRODUCTS BY HIGH PRESSURE/HIGH TEMPERATURE PROCESSING," filed Mar. 11, 2015, the disclosure of which is hereby incorporated herein by reference.

BACKGROUND

Superhard materials comprising polycrystalline diamond (PCD) and cubic boron nitride formed by high pressure/high temperature (HPHT) processing are known in the art, wherein a superhard precursor material and any substrate is loaded into a container or assembly. The which container is then subjected to sufficient HPHT conditions to sinter the superhard precursor material disposed within the container to form a desired superhard product, which can be in the form of a cutting element. A cutting element formed as such may be used, e.g., in applications such as in bits for drilling earthen formations and the like.

SUMMARY

Assemblies as disclosed herein for making superhard products by HPHT process comprise a can for accommodating a mixture of materials, e.g., in the form of a substrate and superhard particles, therein for forming a superhard product by high temperature/high pressure process. A cap is disposed over an open end of the can and has a closed end and a sidewall extending from the closed end, the cap sidewall extends an axial length along a sidewall of the can to provide an overlap therewith. A stop off or sealant barrier is positioned adjacent an open end of the can to form barrier. In an example, the stop off is positioned between the can open end upstream from a sealant material. A wetting element is disposed adjacent the stop off. The wetting element may be in the form of a cup, a band or ring, or the like. A sealant material is disposed along a sidewall portion of the can and is positioned adjacent the wetting element and interposed between sidewalls of the cap and can. The sealant material is formed from a material having an affinity to the wetting element when in a liquid state. In an example, the sealing material is copper and the wetting element is steel. When heated to a melting temperature, the sealant material flows towards and is controlled by the wetting element to provide a leak-tight seal between the cap and can along adjacent overlapping respective sidewall surfaces.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF DRAWINGS

These and other features and advantages of assemblies used for making superhard products by HPHT processing as disclosed herein will be appreciated as the same becomes better understood by reference to the following detailed description when considered in connection with the accompanying drawings wherein.

DETAILED DESCRIPTION

Assemblies or containers as disclosed herein useful for making superhard products by HPHT processing are specially constructed comprising a seal that is positioned along a sidewall portion of the container. In an embodiment, a sidewall seal enables use of the container for making superhard products that may not be otherwise be accommodated by conventional end-sealed containers without having to also modify or replace other elements used during the HPHT process. Accordingly, the assemblies or containers as disclosed herein comprising such side-sealed construction enables the use of existing other elements/members during the HPHT process, to thereby provide operational flexibility and reduce manufacturing costs.

Figure 1A:
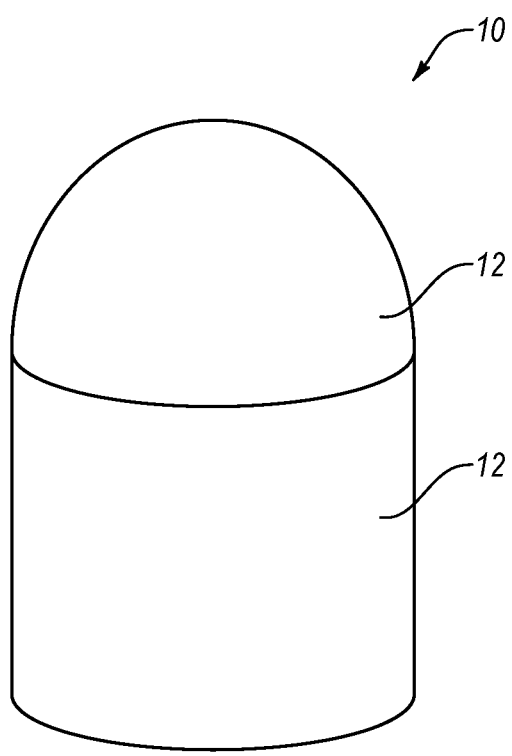
FIGS. 1A and 1B are schematic side view of an example assemblies as disclosed herein.
Figure 1B:
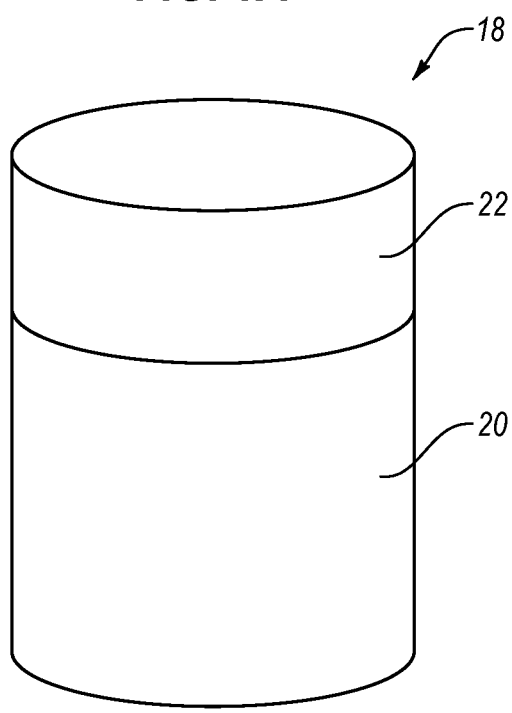

FIGS. 1A and 1B illustrate differently configured example embodiment assemblies as disclosed herein. Specifically, FIG. 1A illustrates an example assembly 10 comprising a can 12 having a dome-shaped configuration that is attached with a cap or cap member 14, wherein a mixture is disposed within one or both of the can and cap. The mixture may comprise a substrate lying adjacent a plurality of superhard particles. The superhard particles 204 may be selected from the group consisting of diamond, polycrystalline diamond, thermally stable products, polycrystalline diamond depleted of its catalyst, polycrystalline diamond having nonmetallic catalyst, cubic boron nitride, cubic boron nitride depleted of its catalyst, and combinations thereof. The substrate may comprise a hard metal such as carbide, tungsten carbide, or other cemented metal carbides. Other possible materials may include hardened steel, hard facing, cubic boron nitride, and other ceramics and/or composites. In an example, the assembly of FIG. 1A may be used to form cutting inserts having a dome-shaped working surface formed from or comprising the superhard material. FIG. 1B illustrates an example assembly 18 comprising a can 20 having a flat-shaped configuration that is attached with a cap or cap member 22, the assembly may include inside a mixture as disclosed above for the example of FIG. 1A. In an example, the assembly of FIG. 1B may be used to form shear cutters having a flat-shaped working surface or cutting inserts having a dome-shaped working surface, wherein each such working surface may be formed from or comprise the superhard material.

It is to be understood that, while embodiments are described throughout the disclosure with respect to a can and cap for illustrative and descriptive clarity, a sealed can may be formed as described between at least two can members. That is, the seal may be formed between a first can portion and a second can portion, which once sealed form a sealed can enclosing materials to be processed under high temperature and high pressure to form a superhard material.

Figure 2:
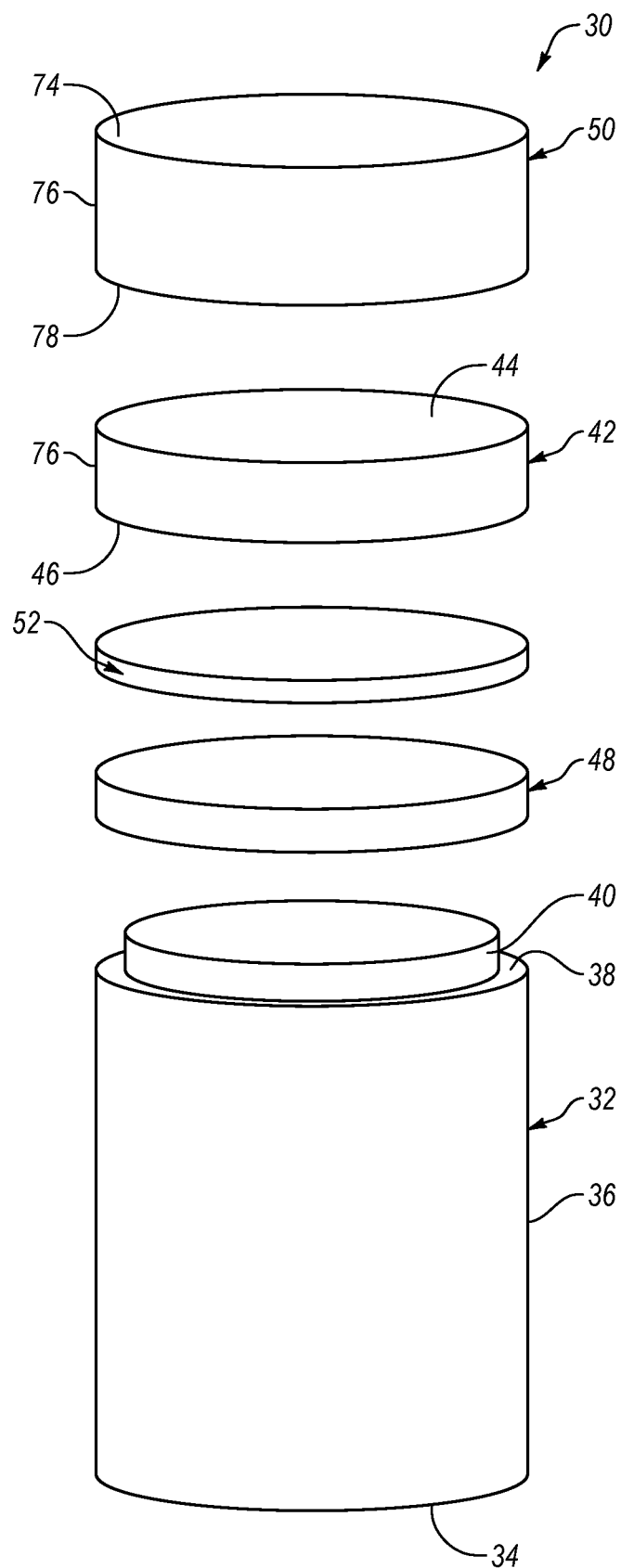
FIG. 2 is an exploded side view of the elements used to form a first example assembly as disclosed herein

FIG. 2 illustrates an exploded view of the various elements useful for making a first example assembly 30 as disclosed herein. Specifically, moving from the bottom of FIG. 2 upwards, the assembly 30 comprises a can 32 in the form of a cylindrical member having a closed bottom end 34 with a cylindrical sidewall 36 extending upwardly a distance therefrom to an open end 38. The can 32 may be formed from materials conventionally used to form containers for HPHT processing, such as but not limited to niobium, which could be a refractory metal can or combinations thereof. In the example illustrated, the can contains a mixture of superhard particles with a substrate disposed adjacent the particle, wherein a portion of the substrate 40 is extending from the can open end 38 for purposes of reference. It is to be understood that in an example embodiment, the substrate is disposed in the can such that an end of the substrate lies at or beneath the can open end 38.

Figure 3:
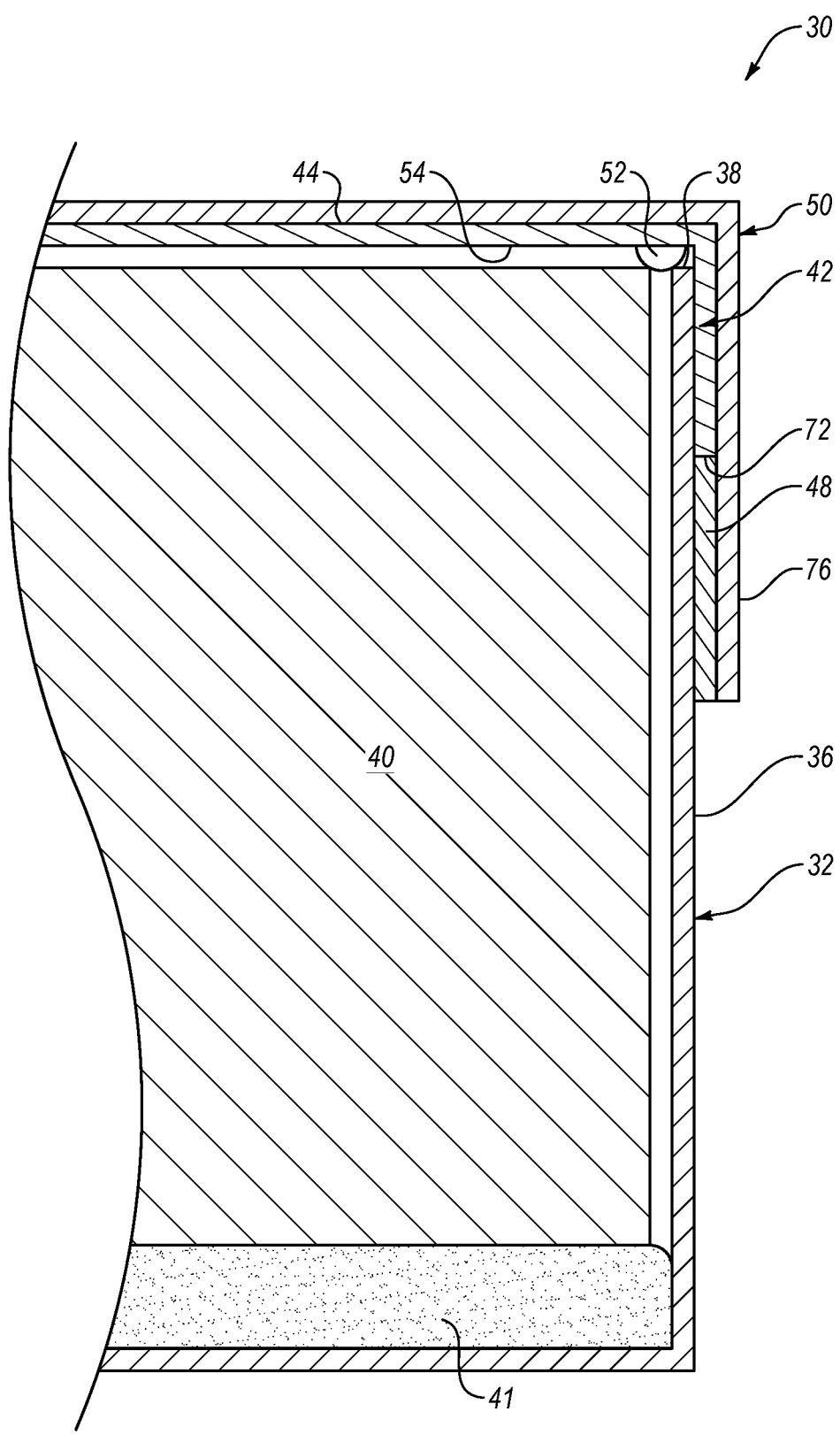
FIG. 3 is a cross-sectional side view of a partial section of the first example assembly of FIG. 2 in as assembled state.

A wetting element or member in the form of a cup 42 is disposed above the open end of the can 40 and is constructed having a closed top end 44, a sidewall 45 extending therefrom to an open lower or bottom end 46 that is sized to fit over the can open end 38. In an example, the cup 42 is formed from a material that acts as an attractant for a sealant material 48 that will be better disclosed below used to form a seal between a sidewall portion of the can 32 and a cap 50 that is disposed over both the cup 42 and a portion of the can 32. In an example, the cup sidewall 45 is sized having a length permitting it to fit over a portion of the can sidewall extending from the can open end 38 (as shown in FIG. 3). The length of overlap between the respective cup and can sidewalls may ensure that the cup operates to control, by the affinity of the sealant material to the cup, the migration of the seal material when it is melted during later processing. In an example, the cup sidewall 45 may extend along at least 2 percent of the length of the can sidewall 36, from about 5 to 25 percent of the length of the can sidewall, from about 10 to 20 percent of the length of the can sidewall, and in an example approximately 25 percent of the length of the can sidewall measured from the can open end 38.

A stop off or sealant barrier 52 is interposed between the cup 42 and the can 32, and is formed from a material that operates to stop or prevent the flow of any sealant material beyond its placement. In an example, the stop off operates to prevent the flow of any sealant material in the form of liquid and/or vapor beyond its placement. In an example, the choice of material useful as the stop off will depend on the type of material selected for the sealant material. Example materials useful as the stop off or sealant barrier include but are not limited alumina materials, inert oxides and nitrides such as graphite, silica, magnesia, yttria, boron nitride, silicon nitride, and combinations thereof. The stop off may be provided in a number of different forms, e.g., in the form of a solder/braze stop, a mask, a tape, a plate, a preformed film, non-preformed film, and combinations thereof. The stop off material may be a coating, etching, brushing, dipping, spraying, silk screening painting, plating, baking, chemical or physical vapor deposition techniques, or any other techniques known in the art for applying the different forms in which the stop off material can be provided. In an example embodiment, the stop off material is provided in the form of a paste comprising an alumina material.

Figure 4:
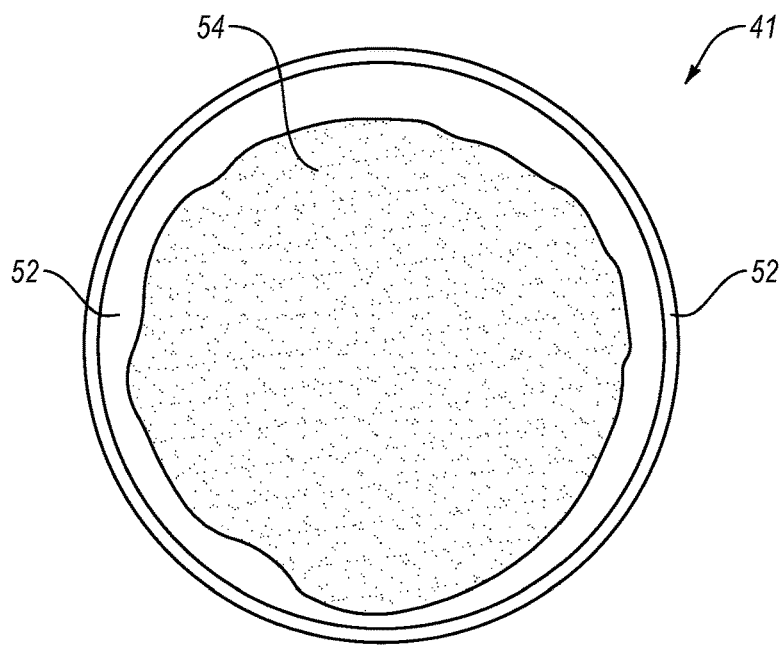
FIG. 4 top plan view of an element used to form the first example assembly of FIG. 2.

With reference to FIG. 4, in an example, the stop off 52 is provided along an inside wall 54 of the cup 42 opposite the top end 44 adjacent to and extending circumferentially around an interface with the sidewall 45. Positioned in this manner, the stop off forms a physical barrier against the can open end 38, when the cup is disposed over and placed down on the cap open end 38, to prevent the passage of any liquid or vapor sealant material thereby and into the can. The stop off may be placed at any part of the assembly where it may be desirable to inhibit the flow of the liquefied sealant material.

In the example embodiment illustrated in FIG. 2, the stop off has a thickness of from about 0.6 to 1.5 mm, and about 1 to 1.2 mm. It is to be understood that the exact thickness of the stop off will be affected, at least in part, by the particular configuration of the wetting element or cup (in this particular example) and the can, and/or the placement location of the stop off. In a particular embodiment, the cup has a wall thickness of approximately 0.1 mm.

Figure 5:
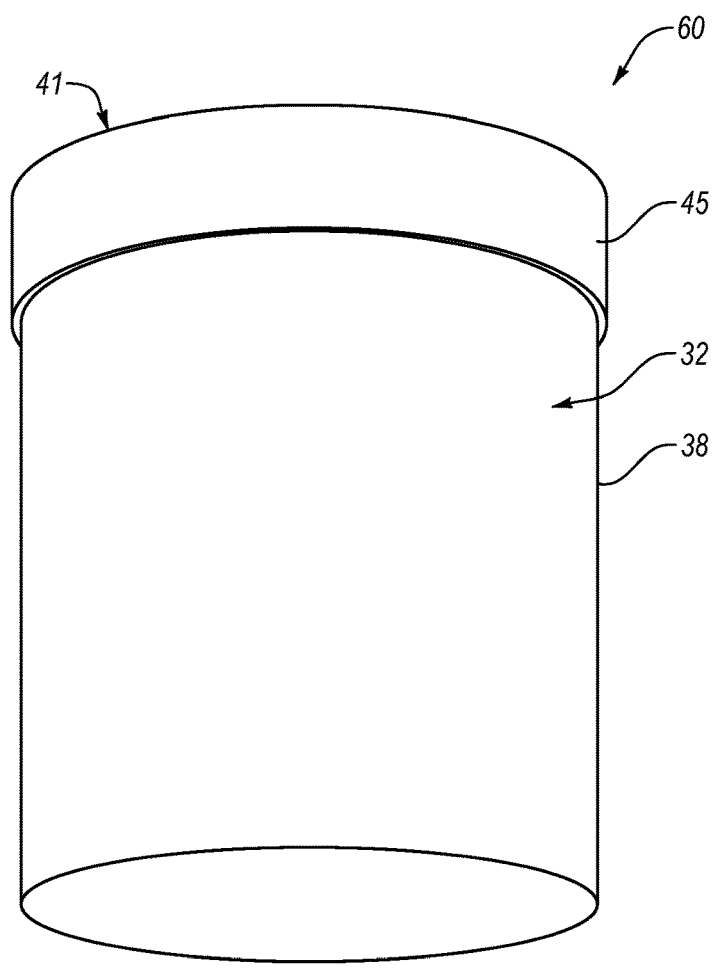
FIG. 5 is a side view of the first example assembly of FIG. 2 in a state of construction.

FIG. 5 illustrates an example assembly 60 as disclosed herein in a partially-assembled state where the cup 42, comprising the stop off disposed therein as discussed above an illustrated in FIG. 4, is placed over the open end of the can so that a desired length of the cup sidewall 45 extends along an adjacent length of the cap sidewall. In this partially-assembled state, the can open end 38 is positioned against the stop off in the cup 42 to form a sealant barrier along the entire circumference of the open end (as best illustrated in FIG. 3 described below).

Referring back to FIG. 2, the example assembly comprises a sealant material 48 that is disposed circumferentially around an exposed region of the can sidewall 36. In an example, the sealant material is selected from materials capable of melting, during vacuum reduction treatment of the materials within the assembly, and flowing to form a leak-tight seal between the can 32 and the cap 50 once cooled and solidified. Examples of materials useful as the sealant material include those that have an affinity with the wetting element, e.g., in this example the cup, such as copper, nickel, cobalt, gold, silver, manganese, palladium, titanium, zinc, phosphorous, boron, aluminum, cadmium, chromium, tin, silicon, tantalum and combinations thereof. In an example, the sealant material that is used is copper, alloys and/or mixtures of copper. In an example embodiment, the sealant material is provided in the form of copper, which may be provided in the form of copper-containing paste, copper in sheet or film form, copper in plate, disc or sleeve form, and that has an affinity to the cup that is formed from steel. In an example, the sealant material is copper that is provided in film form as a tape that is applied around the can sidewall 36. In an embodiment, the amount or volume of the sealant material that is used is sufficient to provide a leak-tight seal between the can and cap 50 without excess that could melt and leak from the assembly during the HPHT process, which could cause a short or other event that would result in an aborted HPHT process, and a discarded part.

In an example, the sealant material is provided having a thickness that is similar to that of the cup to provide an outside sidewall that is substantially uniform in dimension for placement and fitment of the cap thereover. In the example assembly of FIG. 2, the sealant material is provided in the form of three wraps of copper tape, wherein that tape has single-layer thickness of approximately 0.03 mm, and a three-wrap thickness of approximately 0.1 mm. While a particular form of the sealant material has been disclosed, e.g., in the form of multiple wraps of tape, it is to be understood that many alternative forms of the sealant material may exist to provide a certain configuration and/or volume of the sealant material for producing a seal and that all such alternative forms are intended to be within the scope of the assemblies as disclosed herein.

In an example, the minimum volume ratio of the copper sealant material to the steel in the wetting element, e.g., in this example the cup, is 2:1 ensures proper sealing of the assembly. In addition to the amount of the sealant material provided, the placement location of the sealant material may be selected to ensure the flow of the sealant to the interface between the can 32 and cap 50 for purposes of providing the leak-tight seal therebetween.

Figure 6:
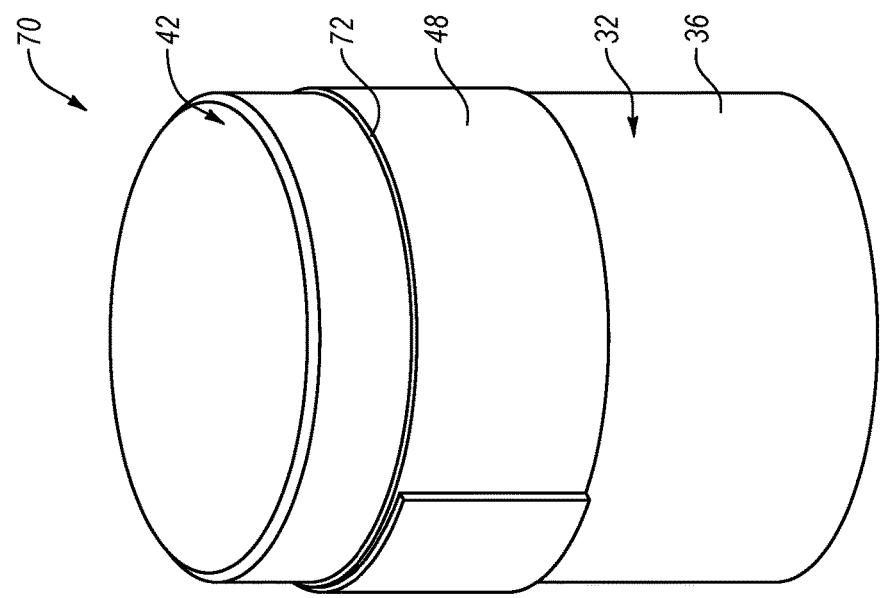
FIG. 6 is a side view of the first example assembly of FIG. 2 in a state of construction.

FIG. 6 illustrates an example assembly 70 as disclosed herein in a partially-assembled state, comprising the cup 42 disposed onto the can 36, wherein the sealant material 48 is disposed circumferentially around the can sidewall 36 adjacent a terminal edge 72 of the cup open end. In this example, the sealant material starts at the terminal edge and extends axially downward along a length of the can sidewall 36 an axial width, which in this case is the axial width of the copper tape (approximately 6.3 mm). In this example, the sealant material is positioned adjacent the terminal edge of the cup a portion of a the sidewall length of the cup, that as disclosed above the sealant material, can operate to attract the flow of sealant material thereto to control the extent of the sealant material's migration when melted such that the sealant material does not migrate beyond the length of the cup sidewall 45.

Figure 7:
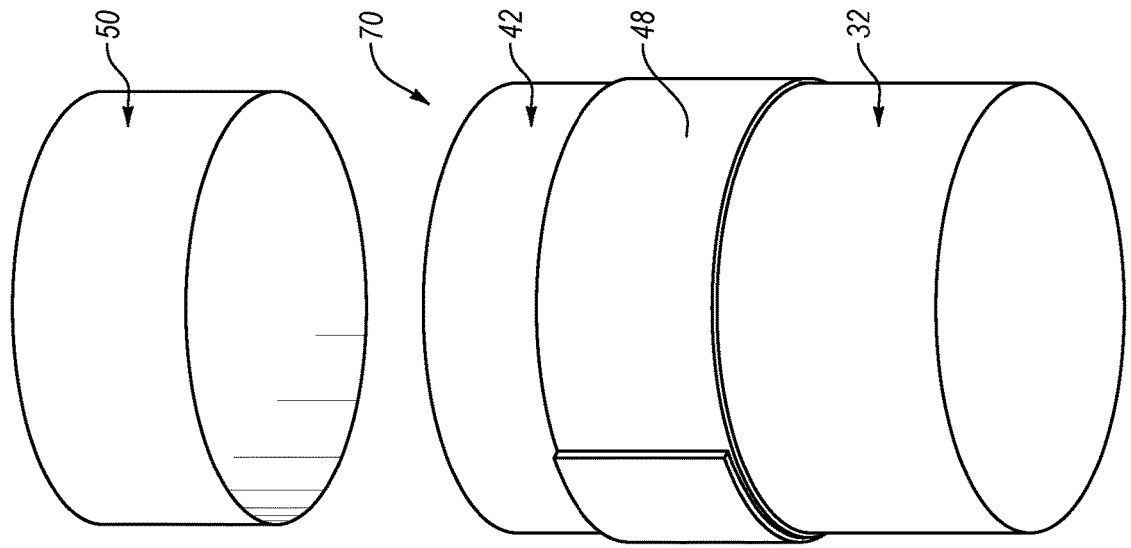
FIG. 7 is a side view of the first example assembly of FIG. 2 in a state of construction.

FIG. 7 illustrates the partially-assembled example assembly 70 of FIG. 6 at a stage where the cap 50 is being prepared to be installed over the combined can 32, cup 42 and sealant material 48. Referring back to FIG. 2, the cap 50 comprises a closed end 74 along a top surface, a cylindrical sidewall 76 extending from the closed end to an open end 78. The cap may be formed from the same types of materials disclosed above for forming the can 32, and in an example is formed from niobium having a wall thickness of about 0.25 mm. In an embodiment, the cap has a sidewall length that is greater than that of the cup sidewall 45 so that it extends therepast and over along a portion of the can sidewall surface 36. In an example, the cap sidewall extends along at least 25 percent of the length of the can sidewall 36, from about 35 to 75 percent of the length of the can sidewall, from about 40 to 60 percent of the length of the can sidewall, and in an example approximately 50 percent of the length of the can sidewall as measured from the can open end 38. Such overlap of the cap sidewall may provide a sufficient sealing area to ensure creation of a robust leak-tight seal between the can and cap sidewalls by the interposed sealant material.

Figure 8:
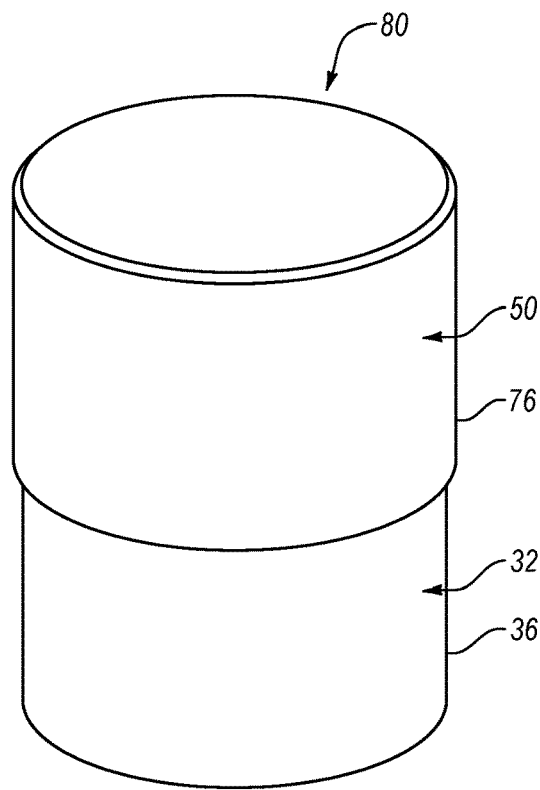
FIG. 8 is a side view of the first example assembly of FIG. 2 in a state of construction.

FIG. 8 illustrates an example assembly 80 with the cap 50 disposed over the cup 32 so as to cover the cup and the sealant material. In an example, the cup cover a majority of the sealant material, and in a particular embodiment cover substantially all of the sealant material so as to optimize placement of the sealant material between the adjacent sidewalls, and to minimize sealant material running out of the assembly (and not being attracted by the cap) when melted. The cap sidewall 76 is sized having an axial length that covers the sealant material, thereby placing the entire sealant material between adjacent can and cap sidewalls 36 and 76 to thereby ensure a sealed surface area therebetween (as best illustrated in FIG. 3).

Figure 9:
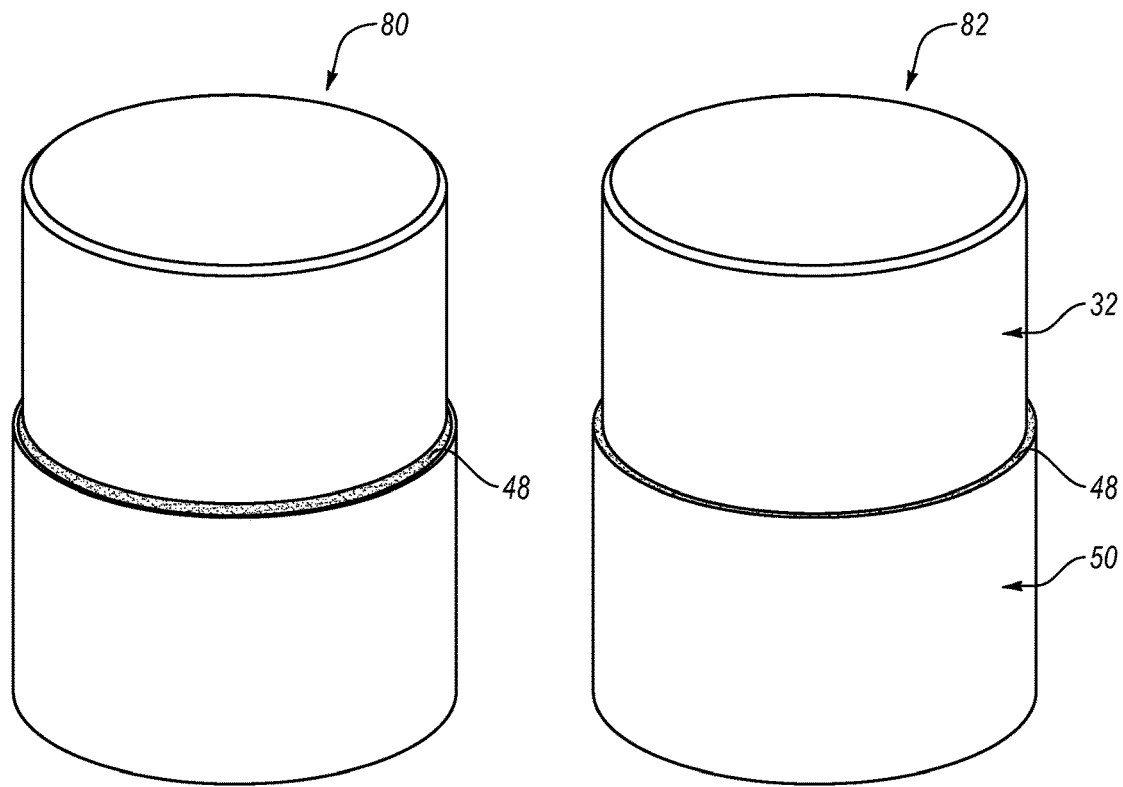
FIG. 9 is a side view of the first example assembly of FIG. 2 in a state of construction.

FIG. 9 illustrates the example assembly of FIG. 8 before and after it has been subjected to a crimping treatment, during which both radial and axial compression forces are imposed on the assembly, e.g., by use of a urethane die or the like. Example assembly 80 is the same as that of FIG. 8, whereby the example assembly 82 is after being subjected to the crimping process. As illustrated by example assembly 82, the crimping process axially compresses the cap 50 and can 32 together so as to further cover the sealant material 48. Additionally, the crimping process imposes radially directed force onto the cap so as to close the gap or tolerance between the can and can sidewalls 36 and 76.

Figure 10:
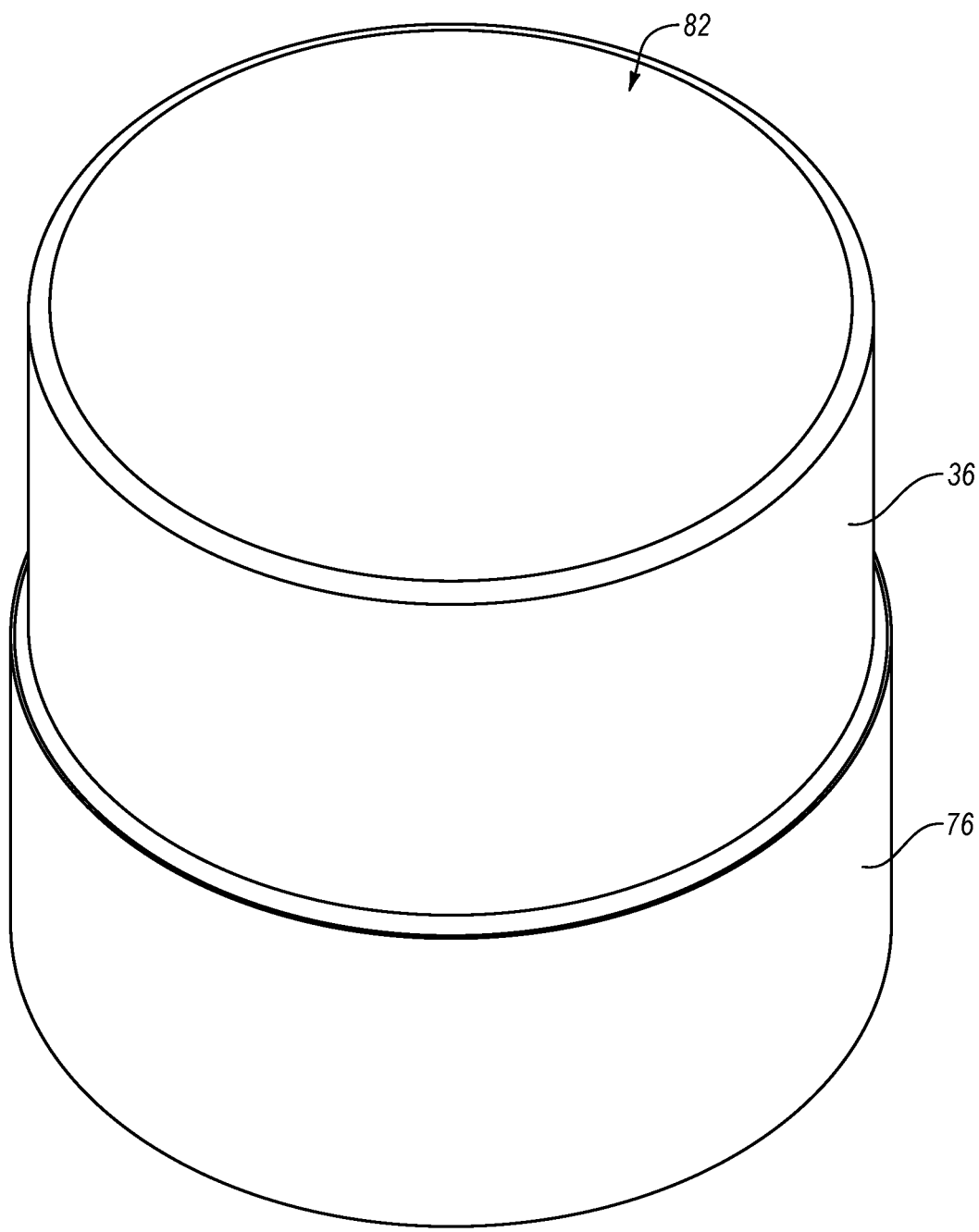
FIG. 10 is a top view of the first example assembly of FIG. 2 in a state of construction.

FIG. 10 illustrates example assembly 82 after being subjected to the crimping process for the purpose of better showing the gap or tolerance between the adjacent can and can sidewalls 36 and 76. In an example, the tolerance (defined as the radial gap between the can outside sidewall surface and can inside sidewall surface) is less than or equal to about 0.15 mm, from about 0 to 0.15 mm, and in an example embodiment approximately 0.1 mm. If the gap is greater than about 0.15 mm, then there is a possibility of the sealing material leaking away from the wetting element, and out of the cap/cup overlapping interface, when in a liquid form.

FIG. 3 illustrates the example assembly 30 of FIG. 2 in an assembled state comprising the can 32 that includes a mixture therein in the form of a substrate 40 and volume of superhard particles 41 positioned adjacent the closed end 34 of the can 32. While a particular arrangement of the mixture is illustrated, it is to be understood that the contents within the can 32 will vary depending on the particular type and/or configuration of superhard product. While the mixture illustrated in FIG. 3 is one comprising a planer substrate interface with the superhard particles disposed thereagainst, resulting in the formation of a superhard product having a planar working surface formed of the superhard particles, it is to be understood that the example assembly 30 as disclosed herein may be used to form superhard products having a nonplanar working surface, which may be in the form of a dome-shaped or other non-planar shaped working surface. As illustrated, the cup 42 is disposed over the open end 38 of the can, and the stop off 52 is positioned along the inside wall 54 of the cup closed end 44 and forms a leak-tight seal with the can open end 38 to prevent the migration of the sealant material in liquid or vapor form to the substrate 40 and the contents within the can. The sealant material 48 is disposed around the can sidewall 36 and extends axially a distance from the terminal edge 72 of the cup 42. The cap 50 is disposed over the cup 42 such that its side wall 76 completely covers the cup sidewall 45 and covers the sealant material 48.

Figure 11:
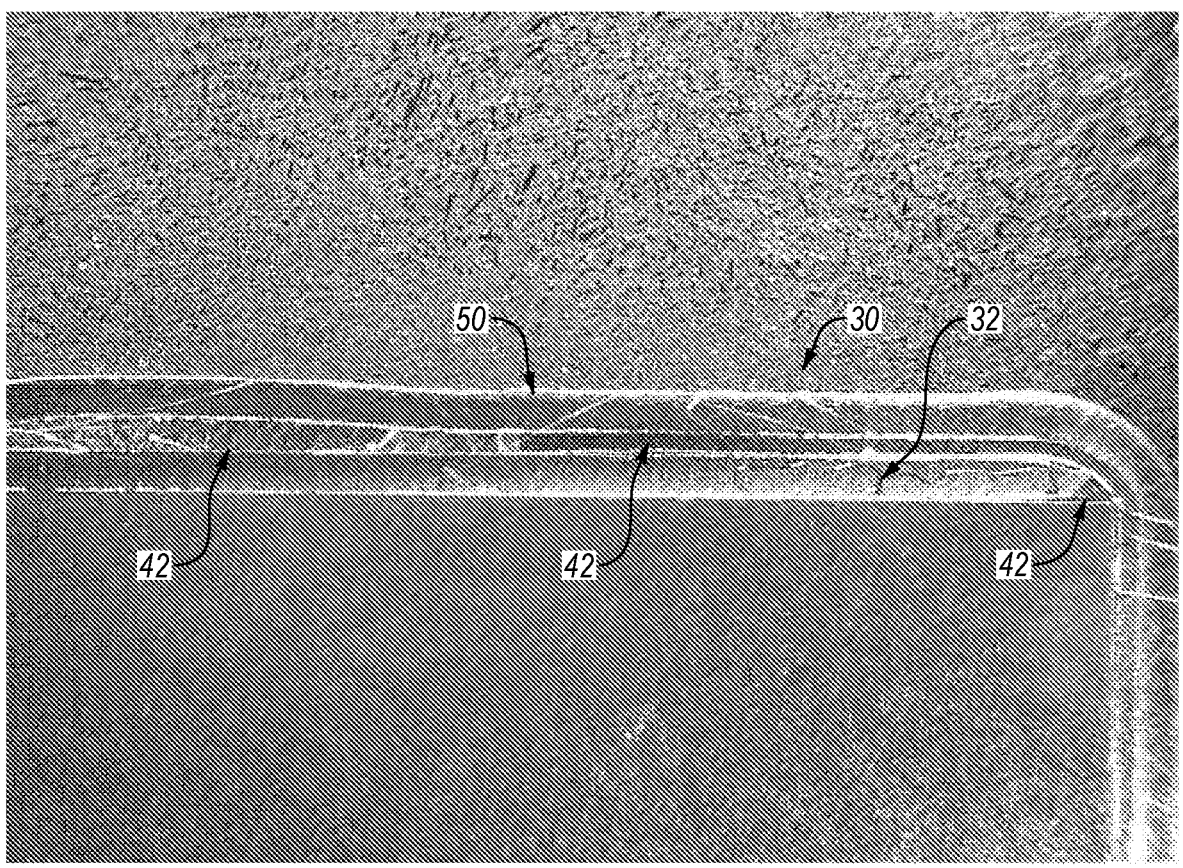
FIG. 11 is a cross-sectional side photomicrograph of a section of the first example assembly of FIG. 2.

FIG. 11 illustrates a magnified section of the example assembly 30 of FIG. 2 after it has been subjected to a vacuum reduction process at elevated temperature, the assembly comprising the can 32, the cup 44, the stop off or sealant barrier 52, the cap 50 and the sealant material 48. Once assembled, the assembly 30 may be placed within a high temperature furnace (not shown). A vacuum may be applied to the furnace to help remove the contaminants from within the furnace as well as the assembly 30. The assembly 30 may then be heated to a cleansing temperature between 900° C. and 1,050° C. for a period of time from about 15 minutes to 60 minutes. This may allow the assembly 30 to be cleansed of impurities in preparation for HPHT processing. Alternate methods may include simultaneously heating and creating a vacuum within the furnace or heating the furnace and then applying a vacuum. The assembly may then be heated to a sealing temperature of between 1,100° C. and 1,200° C. for a period of time, e.g., from about 15 minutes to 25 minutes, which temperature may depend on the type of material selected for use as the sealant material. During this step, the sealant material may melt and flow within the assembly within the gap defined between the can and cap sidewalls as controlled by the sealant material's affinity with the wetting element, in this case the cup 42. In this example, the sealant material flows a short distance along the cup sidewall (as noted by the darker region of the sidewall) and does not reach the stop off 52. In an example, the sealant material 48 melts and flows at a temperature greater than or equal to the cleansing temperature. The assembly 30 may then be allowed to cool within the vacuum furnace until the sealant material 48 has at least partially solidified. The assembly 30 may then be removed from the furnace and may be ready for HPHT processing, or alternatively may be tested to ensure that the sealant material has provided a leak-tight seal between the can and cap.

Figure 12:
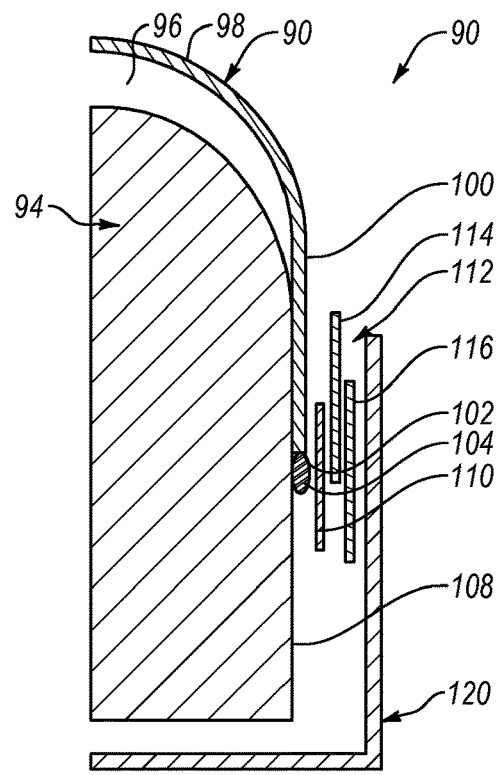
FIG. 12 is a cross-sectional side view of a partial section of a second example assembly.
Figure 13:
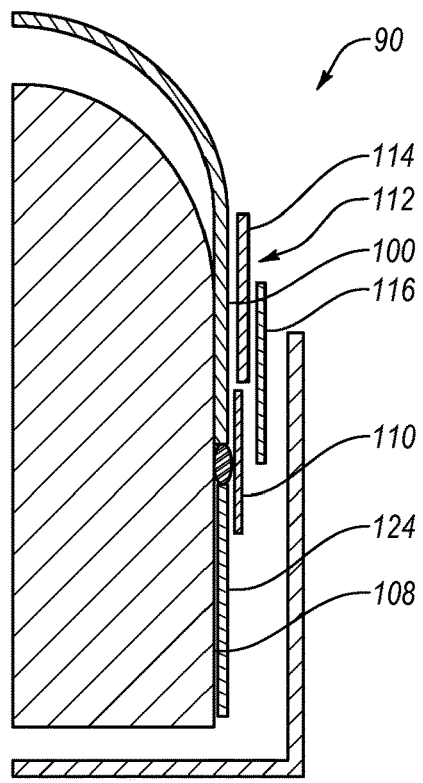
FIG. 13 is a cross-sectional side view of a partial section of a second example assembly.

FIGS. 12 and 13 illustrate second example assemblies 90 as disclosed herein in an exploded view to better illustrate its components. With reference to FIG. 12, the example assembly 90 comprises a can 92 accommodating a mixture that may include a substrate 94 and a volume of superhard particles 96 positioned against a portion of the substrate, wherein in this example the substrate has a dome-shaped surface and the can closed end 98 is dome-shaped to accommodate the same. The can includes a sidewall 100 that extends from the closed end 98 to an open end 102. A stop off 104 is positioned adjacent a terminal edge of the can open end 102 and extends circumferentially around a sidewall 108 of the substrate 94. The stop off may be formed from the same type of material disclosed above for the earlier example assembly. In an example embodiment the stop off is provided having a thickness that is substantially the same as the thickness of the cap. In an example embodiment, the cap has a sidewall thickness of approximately 0.25 mm. A wetting element 110 in the form of an annular band or ring is disposed circumferentially over and around an outside diameter of the stop off 104 and may be formed from the same type of materials disclosed above for the earlier example, e.g., a steel material. In an example, the wetting element is positioned to overlap a portion of the can sidewall 100, and is used for attracting a sealant material to it to control/limit the migration of the sealant material once melted to form a seal in the immediate proximity of the wetting element, and wherein the stop off is used to prevent unwanted migration of the sealant material in liquid or vapor form into the can. In an example embodiment, the wetting element has an axial length of from about 2 to 5 mm, from about 3 to 4 mm, and in an example approximately 3.5 mm. The wetting element has a radial thickness of 0.05 to 0.25 mm, and in an example approximately 0.1 mm.

A sealant material 112 is disposed circumferentially around a diameter of the wetting element 104, and may be provide in the form of one or more bands disposed at the same or different locations relative to one another. In the example illustrated, the sealant material 112 is formed from the same type of materials described above for the earlier assembly embodiment, and in this particular example is provided in two different locations that overlap one another; namely, at a first location as a first band 114 positioned to cover a portion of the wetting element and a portion of the cap sidewall above the wetting element, and at a second location as a second band 116 that is disposed below the first band and that covers a portion of the first band along a top portion and that covers a portion of the wetting element along a bottom portion. It is to be understood that the placement positions of the sealant material can and will vary depending on the particular application and configuration of the assembly, and that other placement positions of the sealant material are to be within the scope of the example assembly as disclosed herein. Functionally, the combined thickness of both sealant material bands is such as to provide a volume of the sealant material sufficient to form the seal. The first and second sealant bands may each have the same approximate radial thickness, and in an example such radial thickness is about 0.05 to 0.25 mm, and in an example approximately 0.1 mm. A cap 120 is positioned over the exposed portion of the substrate 94 includes a sidewall 122 that extends over and overlaps the open end of the can 102 and its sidewall 100 to contain the mixture, e.g., the substrate and the superhard particles, within the assembly.

The example assembly 30 is then subjected to the crimping process as disclosed above for the purpose of radially and axially compacting the assembly and reducing the gap or tolerance between the adjacent/opposed cap and can sidewalls. In an example, after the crimping process, the gap or tolerance is less than or equal to about 200 micrometers. When subjected to vacuum reduction as disclosed above, the sealant material melts and forms a seal between the overlapping regions of the can sidewall 100 and the cap sidewall 122, wherein such sealant material is localized adjacent the wetting element and does not flow past the stop off. In such example embodiment, the minimum volume of the sealant material, e.g., copper, to the wetting element, e.g., steel, is greater than about 2:1, and preferably about 3:1 to ensure proper sealing of the assembly. The minimum width as measured axially of the wetting element in the form of a steel strip or band is greater than about 1.25 mm, and preferably about 2 mm.

FIG. 13 illustrates a variation of the second example assembly 90, comprising the same elements as disclosed above for the second example assembly illustrated in FIG. 12, except that the sealant material 112 bands 114 and 116 are positioned differently with respect to one another. Specifically, the first sealant band 114 is positioned axially above the wetting element 110 and disposed circumferentially around the can sidewall 100, and the second sealant band 116 is disposed circumferentially around a portion of the first sealant band 114 and a portion of the wetting element 110. This is but one other example of how the sealant material may be positioned in the assembly to provide a seal. Additionally, the second example assembly of FIG. 13 illustrates a further stop off 124 disposed along the otherwise exposed substrate sidewall, which can be made from the same materials disclosed above for the stop off, and which may be provide in the form of a coating applied by brush, dip, spray or other deposition technique useful for the purpose of forming a film of material along the substrate sidewall. The further stop off may also be provided in the form of a preformed element such as a sleeve or the like disposed circumferentially around the substrate sidewall. In either case, such further stop off 124 may operate to protect the substrate from melted sealant material in liquid of vapor form when melting and forming the seal. Also, the stop off material may be used as barrier material to limit the flow of sealant material after melting so that the sealant material will stay in the sealing area, instead of bleeding out and compromising the sealing effect.

Figure 14:
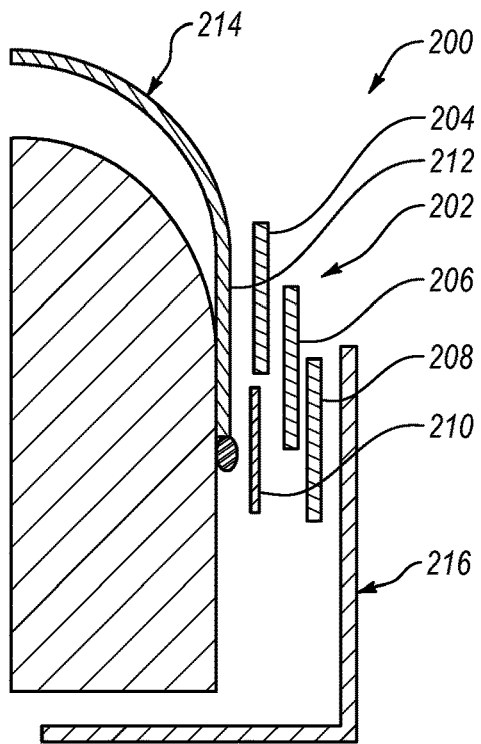
FIG. 14 is a cross-sectional side view of a partial section of a third example assembly.
Figure 15:
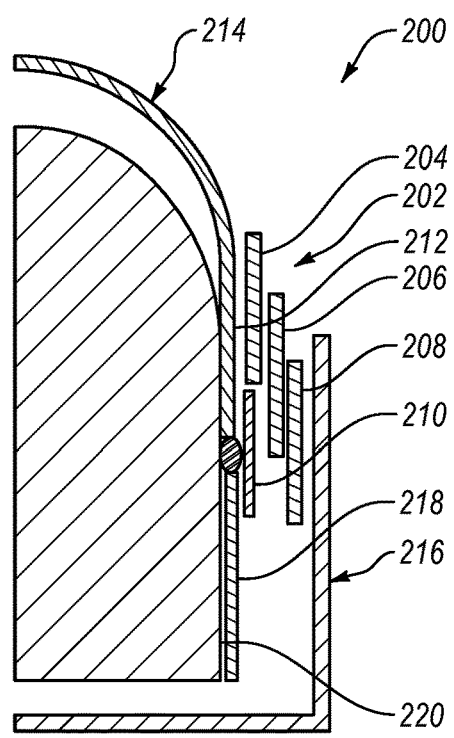
FIG. 15 is a cross-sectional side view of a partial section of a third example assembly.
Figure 16:
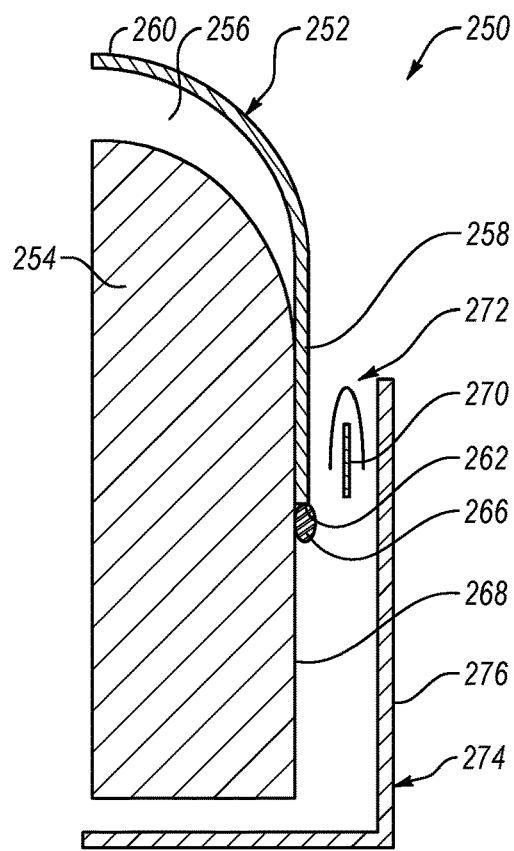
FIG. 16 is a cross-sectional side view of a partial section of a fourth example assembly.

FIGS. 14 and 15 illustrate third example assemblies 200 as disclosed herein in an exploded view to better illustrate its components, wherein such third example assemblies 200 comprise the component elements as disclosed above with reference to the second example assemblies, with the difference being the configuration of the sealant material. The third example assemblies 200 are provided for the purpose of illustrating the sealant material 202 as provide in the form of three bands 204, 206 and 208. For each of the example assemblies of FIGS. 14 and 15, the sealant material 202 is provide in the form of a first band 204 positioned above the wetting element 210 and disposed circumferentially around a sidewall 212 of the can 214. The second band 206 is positioned below the first band, and disposed circumferentially around a portion of the first band 204 and around a portion of the wetting element 210. The third band 208 is positioned below the second band, and disposed circumferentially around a portion of the second band 206 and a remaining portion of the wetting element 210. In an example, the combined thickness of the three bands is as disclosed above for the combined bands of the second example embodiment. The assembly comprises a cap 216 that is disposed over the can 214, and the assembly is subjected to crimping treatment and vacuum reduction process as disclosed above to provide a leak-tight seal along the overlapping cap and can sidewalls of the assembly. FIG. 15 illustrates a third example assembly as disclosed above and illustrated in FIG. 14, with the additional presence of a further stop off 218, as disclosed above for the second example assembly of FIG. 13, for the purpose of providing a further degree of protection to the substrate sidewall 220 from the sealant material when melted to form the seal and keep the sealant in the sealing area to maximize the sealing effect FIG. 16 illustrates a fourth example assembly 250 as disclosed herein comprising a can 252 accommodating a mixture that may include a substrate 254 and a volume of superhard particles 256 positioned against a portion of the substrate. The can includes a sidewall 258 that extends from the closed end 260 to an open end 262. A stop off 266 is positioned adjacent a terminal edge of the can open end 262 and extends circumferentially around a sidewall 268 of the substrate 254. The stop off may be formed from the same type of material disclosed above for the example assemblies. A wetting element 270 is provided in the form of a band or ring and is disposed circumferentially over and around an outside diameter of the can sidewall 258 positioned axially above the stop off 266, and may be formed from the same type of materials disclosed above for the earlier example assemblies. A sealant material 272 is provided in the form of a u-shaped band disposed around both an inside and outside diameter of the wetting element. In an example, the thickness of u-shaped band when doubled over is as disclosed above for the combined bands of the third example embodiment. A cap 274 comprising a sidewall 276 is disposed over the can open end 262 to encapsulate contents of the can to form the assembly, and the assembly is subjected to the crimping treatment and the vacuum reduction process as disclosed above. The sealing material 272 melts and flows between the adjacent overlapping cap and can sidewalls 258 and 276 to provide a leak-tight seal therealong.

Figure 17:
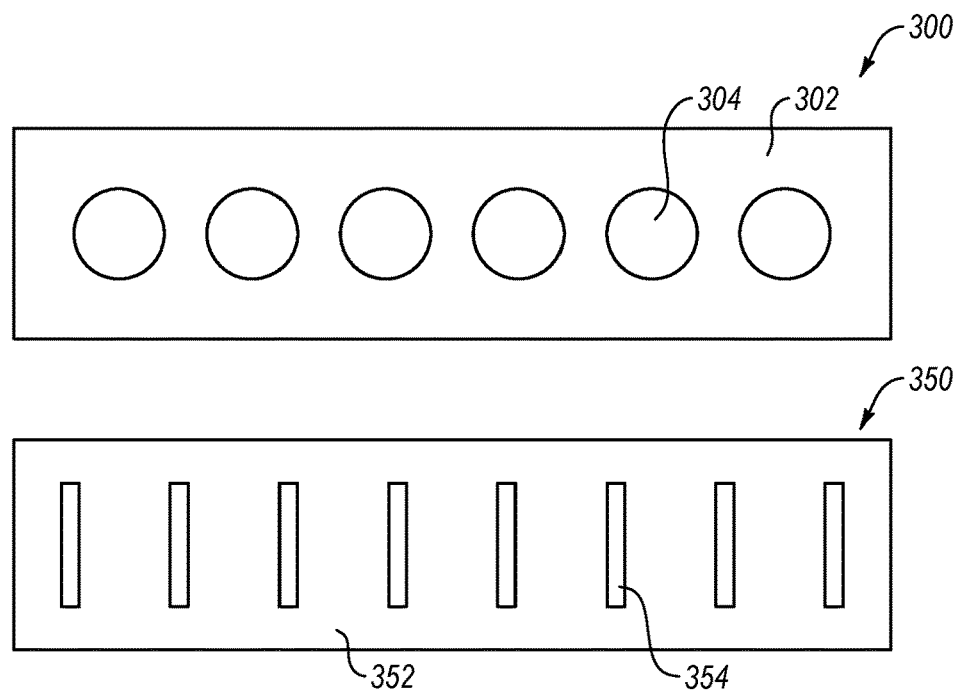
FIG. 17 is a top view of a differently configured wetting elements that may be used to form the second, third and fourth assemblies.

FIG. 17 illustrates different configurations of wetting elements 300 and 350 as used to form example assemblies as disclosed herein. The wetting element, when provided in the form of a band such as that illustrated in FIGS. 12 to 16 disclosed above, may be configured having a solid configuration. Alternatively, the wetting element may be configured having one or more perforations or openings extending therethrough for the purpose of facilitating the formation of a seal that extends between the cap and can overlapping sidewalls. The wetting element 300 illustrates one such example comprising a band 302 having a number of circular openings 304 disposed therethrough for the purpose of facilitating sealant material migration therethrough. The wetting element 350 illustrates another example comprising a band 352 having a number of rectangular slits 354 disposed therethrough for the purpose of facilitating sealant material migration therethrough, wherein the slits may operate to provide a reduced amount of sealant flow when compared to the wetting element 300 and its circular openings. It is to be understood that these are just two examples of how the wetting element may be configured with openings or the like to facilitate sealant migration therethrough and that many other opening configurations are possible and intended to be within the scope of the assemblies as disclosed herein.

A feature of the assemblies or containers as disclosed herein, useful for making superhard products by HPHT processing, is that that they are each specially constructed to comprise a seal that is positioned along a sidewall portion of the container, e.g., between adjacent and overlapping sidewalls of the can and the cap. Such assemblies as disclosed herein thereby operates to enable use of the assemblies for making superhard products that may not otherwise be accommodated by conventional end-sealed containers without having to also modify or replace other elements used during the HPHT process.

Although only a few example embodiments have been described in detail above, those skilled in the art will readily appreciate that many modifications are possible in the example embodiments without materially departing from the concepts as disclosed herein. For example, while embodiments are described throughout the disclosure with respect to a can and cap for illustrative and descriptive clarity, a sealed can may be formed as described between at least two can members. That is, the seal may be formed between a first can portion and a second can portion, which once sealed form a sealed can enclosing materials to be processed under high temperature and high pressure to form a superhard material. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An assembly for making superhard constructions by high pressure/high temperature process comprising:
   a first can portion for accommodating a mixture of materials therein for forming a superhard product by high temperature/high pressure process;
   a second can portion disposed over an open end of the first can portion and having a closed end and a sidewall extending from the closed end, the second can portion sidewall extending an axial length along an outer sidewall surface of the first can portion to provide an overlap therewith;
   a stop off interposed between the first can portion and an inside surface of the second can portion to form a barrier therebetween;
   a sealant material disposed along the outer sidewall surface of the first can portion and positioned adjacent an open end of the second can portion positioned along the outer sidewall surface of the first can portion; and
   a third can portion having a closed end and a sidewall extending from the closed end, wherein an inner surface of the third can portion closed end is disposed over an outer surface of the second can portion closed end, and wherein the third can portion sidewall extends a complete axial length along an outer sidewall surface of the second can portion and at least a partial axial length along the sealant material such that the sealant material is interposed within an annular region between the first can portion outer sidewall surface and an inner sidewall surface of the third can portion,
   wherein the first can portion, the second can portion and the third can portion are made from a material that does not melt during the high temperature/high pressure process used for making superhard constructions.

2. The assembly as recited in claim 1 wherein the second can portion is in the form of a cup, and wherein the cup sidewall extends axially a distance from the cup closed end that covers about 5 to 25 percent of the total length of the first can portion sidewall as measured from the first can portion open end.

3. The assembly as recited in claim 2 wherein the third can portion is in the form of a cap, and wherein the cap sidewall extends axially a distance from the cap closed end that covers about 35 to 75 percent of the total length of the first can portion sidewall as measured from the first can portion open end.

4. The assembly as recited in claim 2 wherein the sealant material is positioned adjacent a terminal edge of an open end of the cup.

5. The assembly as recited in claim 2 wherein the stop off extends circumferentially between the inner surface of the cup closed and the first can portion open end to prevent migration of the sealant material into the mixture of materials.

6. The assembly as recited in claim 1 wherein the sealant material has a radial thickness that is similar to a thickness of the can second portion sidewall.

7. The assembly as recited in claim 1 wherein the sealant material is provided in the form of two or more layers around the first can portion sidewall outer surface.

8. The assembly as recited in claim 1 wherein the second can portion is formed from a material that operates as an attractant to the sealing material when the sealing material is melted during processing.

9. The assembly as recited in claim 8 wherein the second can portion is formed from steel.

10. The assembly as recited in claim 1 wherein the second can portion is formed from steel and the sealant material comprises copper.

11. An assembly for making superhard constructions by high pressure/high temperature process, the assembly comprising before being subjected to the high pressure/high temperature process:
    a can for accommodating a mixture of materials therein for forming a superhard product by high temperature/high pressure process, the can having a closed end, and a cylindrical sidewall extending from the closed end to an open end;
    a cup having a closed end disposed over the can open end, and the cup having a sidewall extending axially a distance along an outer surface of the can sidewall;
    a sealant material disposed around the outer surface of the can sidewall adjacent an end of the cup sidewall, wherein the sealant material is formed from a material that has an affinity with the cup when the sealant material is melted; and
    a cap having a closed end and a sidewall extending axially therefrom, wherein the cap is disposed over the cup and the cap sidewall extends over an outer surface of the cup sidewall and extends over at least a portion of the sealant material,
    wherein the can, cap and cup are made from materials that do not melt during the high pressure/high temperature process.

12. The assembly as recited in claim 11 further comprising a stop off material that is positioned between adjacent surfaces of the can and cup to prevent migration of the sealant material there past during high pressure/high temperature conditions.

13. The assembly as recited in claim 12 wherein the stop off material is positioned along an inside surface of the cup closed end.

14. The assembly as recited in claim 11 wherein the sealant material is positioned adjacent the cup open end.

15. The assembly as recited in claim 11 wherein the sealant material has a thickness that is substantially the same as a thickness of the cup sidewall.

16. The assembly as recited in claim 11 wherein substantially all of the sealant material is covered by the cup sidewall.

17. The assembly as recited in claim 11 comprising a seal formed between opposed portions of the can sidewall outer surface and the cap sidewall inner surface when the sealant material is melted.

18. A method for forming a seal in an assembly used to make superhard constructions at high pressure/high temperature conditions, the method comprising the steps of:
    placing a mixture of precursor superhard materials into a first can portion comprising a closed end with a sidewall extending axially therefrom to an open end;
    covering the open end with a cup having a closed end and having a sidewall extending axially therefrom and along an outer surface of the first can portion sidewall;
    applying a sealant material along the outer surface the first can portion sidewall;
    placing a second can portion having a closed end and a sidewall extending axially therefrom over an outer surface of the cup closed end and the cup sidewall to cover the cup and form an assembly, wherein at least a portion of the sealant material is covered by the second can portion sidewall; and
    subjecting the assembly to a temperature sufficient to melt the sealant material to cause the sealant material to migrate and occupy an annular region between overlapping sidewalls of the first can portion and second can portion, wherein the can, cup and cap are made from materials that do not melt during the high pressure/high temperature process.

19. The method as recited in claim 18 wherein during the step of subjecting, migration of the melted sealant material is controlled to a region adjacent the second can portion by reason of the second can portion being formed from a material that the sealant material has an affinity for.

20. The method as recited in claim 18 wherein during the step of subjecting, migration of the sealant material in liquid or vapor form into a region of the first can portion containing the mixture is prevented by a stop off interposed between opposed surfaces of the first can portion and the cup.

* * * * *